US009391407B1

(12) United States Patent
Bucher et al.

(10) Patent No.: US 9,391,407 B1
(45) Date of Patent: Jul. 12, 2016

(54) ELECTRICAL CONNECTOR ASSEMBLY HAVING STEPPED SURFACE

(71) Applicant: Tyco Electronics Corporation, Berwyn, PA (US)

(72) Inventors: Alan Weir Bucher, Manheim, PA (US); Nikhil Shankar, Harrisburg, PA (US); Eric David Briant, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/737,585

(22) Filed: Jun. 12, 2015

(51) Int. Cl.
*H01R 13/6581* (2011.01)
*H01R 12/70* (2011.01)
*H01R 13/66* (2006.01)

(52) U.S. Cl.
CPC ........ *H01R 13/6581* (2013.01); *H01R 12/7076* (2013.01); *H01R 13/665* (2013.01)

(58) Field of Classification Search
CPC ........... H01R 13/6581; H01R 12/7076; H01R 13/665
See application file for complete search history.

(56) References Cited

U.S. PATENT DOCUMENTS

| 6,364,709 | B1* | 4/2002 | Jones | H01R 13/65802 439/567 |
| 6,368,153 | B1* | 4/2002 | Hwang | H05K 9/0058 439/353 |
| 6,416,361 | B1* | 7/2002 | Hwang | H01R 13/65802 174/51 |
| 6,430,053 | B1* | 8/2002 | Peterson | H01R 13/6335 361/728 |
| 6,443,768 | B1* | 9/2002 | Dirkers | H01R 13/65802 439/567 |
| 6,478,622 | B1* | 11/2002 | Hwang | H01R 13/65802 385/92 |
| 6,508,670 | B1* | 1/2003 | Hwang | H01R 13/65802 439/108 |
| 6,511,345 | B1* | 1/2003 | Hwang | H01R 12/707 439/541.5 |

(Continued)

*Primary Examiner* — Ross Gushi

(57) ABSTRACT

An electrical connector assembly includes a cage member having a plurality of walls defining a port configured to receive a pluggable module therein through a front end of the cage member. The pluggable module is configured to be electrically connected to a communication connector housed within the cage member at a rear end of the cage member. The walls are manufactured from a metal material and provide electrical shielding for the pluggable module and the communication connector. The walls include side walls and a top wall between the side walls. The top wall is non-planar and includes an upper step and a lower step. The lower step is aligned above the communication connector at or near the rear end and the upper step is aligned above the pluggable module at or near the front end.

20 Claims, 3 Drawing Sheets

(56) References Cited

U.S. PATENT DOCUMENTS

| | | | | |
|---|---|---|---|---|
| 6,524,134 B2* | 2/2003 | Flickinger | H05K 9/0058 | 439/607.2 |
| 6,558,191 B2* | 5/2003 | Bright | G02B 6/4246 | 439/541.5 |
| 6,600,865 B2* | 7/2003 | Hwang | H01R 23/6873 | 361/760 |
| 6,612,868 B2* | 9/2003 | Hwang | H01R 13/65802 | 385/92 |
| 6,655,995 B1* | 12/2003 | Reisinger | H01R 13/65802 | 439/607.35 |
| 6,666,694 B1* | 12/2003 | Daly | H01R 23/6873 | 439/547 |
| 6,666,720 B1* | 12/2003 | Reisinger | H01R 13/65802 | 439/607.13 |
| 6,724,641 B1* | 4/2004 | Hwang | G02B 6/4277 | 174/387 |
| 6,729,905 B1* | 5/2004 | Hwang | H01R 13/65802 | 439/607.21 |
| 6,731,519 B1* | 5/2004 | Hwang | G02B 6/4277 | 174/387 |
| 6,780,053 B1* | 8/2004 | Yunker | G02B 6/4201 | 439/607.2 |
| 6,816,376 B2* | 11/2004 | Bright | G02B 6/4201 | 165/185 |
| 6,822,872 B2* | 11/2004 | Schulz | H05K 9/0058 | 361/747 |
| 6,824,429 B2* | 11/2004 | Hwang | H01R 23/6873 | 439/607.2 |
| 6,867,969 B2* | 3/2005 | Hwang | H05K 9/0058 | 165/185 |
| 6,878,872 B2* | 4/2005 | Lloyd | G02B 6/4277 | 174/366 |
| 6,893,294 B2* | 5/2005 | Moriyama | G02B 6/4201 | 439/607.2 |
| 6,926,551 B1* | 8/2005 | Schulz | H01R 13/6272 | 439/310 |
| 6,943,287 B2* | 9/2005 | Lloyd | H01R 13/65802 | 174/359 |
| 6,972,968 B2* | 12/2005 | Hwang | H05K 9/0058 | 174/383 |
| 6,980,437 B2* | 12/2005 | Bright | H05K 7/20418 | 165/185 |
| 7,001,217 B2* | 2/2006 | Bright | G02B 6/4201 | 439/607.2 |
| 7,037,136 B1* | 5/2006 | Korsunsky | H01R 13/5213 | 174/16.1 |
| 7,037,137 B2* | 5/2006 | Lee | H01R 13/65807 | 439/607.06 |
| 7,044,777 B1* | 5/2006 | Daly | H01R 23/6873 | 439/540.1 |
| 7,070,446 B2* | 7/2006 | Henry | H01R 13/65802 | 439/541.5 |
| 7,242,586 B2* | 7/2007 | Cheng | G02B 6/4201 | 361/728 |
| 7,249,966 B2* | 7/2007 | Long | H01R 13/65802 | 439/490 |
| 7,261,591 B2* | 8/2007 | Korsunsky | H01R 12/727 | 439/541 |
| 7,275,959 B2* | 10/2007 | Daly | H01R 23/6873 | 439/540.1 |
| 7,322,854 B2* | 1/2008 | Long | H01R 13/65802 | 439/607.28 |
| 7,357,673 B2* | 4/2008 | Long | H01R 12/716 | 439/607.05 |
| 7,371,965 B2* | 5/2008 | Ice | G02B 6/4201 | 174/50 |
| 7,421,184 B2* | 9/2008 | Long | G02B 6/0001 | 362/551 |
| 7,438,596 B2* | 10/2008 | Phillips | H01R 13/6582 | 439/607.01 |
| 7,452,216 B2* | 11/2008 | Murr | H01R 13/665 | 439/74 |
| 7,455,554 B2* | 11/2008 | Long | G02B 6/4201 | 439/607.17 |
| 7,488,212 B2* | 2/2009 | Chen | G02B 6/4277 | 361/800 |
| 7,530,845 B1* | 5/2009 | Yang | G02B 6/4201 | 439/607.01 |
| 7,539,018 B2* | 5/2009 | Murr | H05K 7/20418 | 165/185 |
| 7,557,305 B2* | 7/2009 | Su | H01R 12/585 | 174/376 |
| 7,557,306 B2* | 7/2009 | Chen | H05K 9/0058 | 174/377 |
| 7,559,800 B2* | 7/2009 | Wu | H01R 13/65802 | 439/607.3 |
| 7,575,471 B2* | 8/2009 | Long | G02B 6/0001 | 439/541.5 |
| 7,583,510 B2* | 9/2009 | Wang | H01R 13/65802 | 174/350 |
| 7,612,299 B2* | 11/2009 | Chen | H05K 9/0058 | 174/359 |
| 7,625,223 B1* | 12/2009 | Fogg | H05K 5/0247 | 361/715 |
| 7,641,515 B1* | 1/2010 | Szczesny | H01R 13/65802 | 439/541.5 |
| 7,704,097 B1* | 4/2010 | Phillips | H01R 13/7172 | 439/607.01 |
| 7,727,018 B2* | 6/2010 | Bright | H01R 13/65802 | 439/607.28 |
| 7,764,504 B2* | 7/2010 | Phillips | G02B 6/4246 | 165/80.2 |
| 7,845,975 B2* | 12/2010 | Cheng | H01R 23/6873 | 439/541.5 |
| 7,869,224 B1* | 1/2011 | Yang | G02B 6/4284 | 174/350 |
| 7,871,294 B2* | 1/2011 | Long | G02B 6/0001 | 439/540.1 |
| 7,896,659 B1* | 3/2011 | Westman | H01R 13/514 | 439/108 |
| 7,963,795 B1* | 6/2011 | Yang | G02B 6/4293 | 439/490 |
| 7,974,098 B2* | 7/2011 | Oki | G02B 6/4201 | 165/185 |
| 8,053,667 B2* | 11/2011 | Chen | H05K 9/0058 | 174/50 |
| 8,105,110 B2* | 1/2012 | Hsia | H01R 23/6873 | 439/152 |
| 8,123,559 B2* | 2/2012 | Brown | G02B 6/4201 | 361/816 |
| 8,162,675 B2* | 4/2012 | Regnier | H01R 9/038 | 439/76.1 |
| 8,182,290 B2* | 5/2012 | Fonteneau | H05K 9/0058 | 439/607.21 |
| 8,182,291 B2* | 5/2012 | Tsou | H01R 23/6873 | 439/607.55 |
| 8,183,470 B2* | 5/2012 | Zhang | H05K 9/0058 | 174/359 |
| 8,189,982 B2* | 5/2012 | Yang | G02B 6/4201 | 385/134 |
| 8,197,282 B1* | 6/2012 | Su | H01R 13/518 | 439/540.1 |
| 8,203,084 B2* | 6/2012 | Wertz, Jr. | H01R 13/6584 | 174/368 |
| 8,277,252 B2* | 10/2012 | Fogg | H01R 13/6477 | 439/607.25 |
| 8,335,416 B2* | 12/2012 | Shirk | G02B 6/0008 | 385/146 |
| 8,339,784 B2* | 12/2012 | Pirillis | H01R 13/6586 | 361/679.5 |
| 8,342,881 B2* | 1/2013 | Lang | H01R 9/038 | 439/607.01 |
| 8,393,917 B2* | 3/2013 | Regnier | H05K 7/20709 | 439/485 |
| 8,419,212 B2* | 4/2013 | MacDougall | H01R 12/712 | 362/227 |
| 8,426,751 B2* | 4/2013 | Lee | H01R 13/506 | 174/520 |
| 8,449,312 B2* | 5/2013 | Lang | H01R 9/038 | 439/352 |
| 8,449,331 B2* | 5/2013 | Phillips | H01R 13/6581 | 361/704 |

(56) References Cited

U.S. PATENT DOCUMENTS

| | | | | |
|---|---|---|---|---|
| 8,460,033 B2* | 6/2013 | Regnier | H01R 9/038 | 439/607.13 |
| 8,465,320 B2* | 6/2013 | Long | G02B 6/0001 | 439/541.5 |
| 8,467,190 B2* | 6/2013 | Yi | G02B 6/4269 | 361/679.46 |
| 8,469,738 B2* | 6/2013 | Long | G02B 6/0001 | 439/541.5 |
| 8,469,744 B2* | 6/2013 | Nichols | H01R 13/518 | 439/607.01 |
| 8,500,490 B2* | 8/2013 | Tsou | H01R 23/6873 | 439/607.55 |
| 8,545,267 B2* | 10/2013 | Fogg | H01R 13/6477 | 439/607.25 |
| 8,545,268 B2* | 10/2013 | Fogg | H01R 13/6477 | 439/607.25 |
| 8,613,632 B1* | 12/2013 | Nichols | H01R 13/6587 | 439/485 |
| 8,684,765 B2* | 4/2014 | Shirk | G02B 6/0008 | 362/551 |
| 8,740,644 B2* | 6/2014 | Long | G02B 6/0001 | 439/541.5 |
| 8,740,646 B2* | 6/2014 | Lang | H01R 9/038 | 439/607.01 |
| 8,747,159 B2* | 6/2014 | Liu | G02B 6/428 | 439/607.2 |
| 8,753,145 B2* | 6/2014 | Lang | H01R 9/038 | 439/527 |
| 8,823,540 B2* | 9/2014 | Scholeno | H01R 12/716 | 340/815.4 |
| 8,864,523 B2* | 10/2014 | Banakis | H01R 13/6585 | 439/607.25 |
| 8,870,595 B2* | 10/2014 | Schmitt | H01R 13/6587 | 439/607.25 |
| 8,879,267 B2* | 11/2014 | Henry | H04L 12/6418 | 165/104.33 |
| 8,885,342 B2* | 11/2014 | Skepnek | H01L 23/367 | 174/548 |
| 8,890,004 B2* | 11/2014 | Wickes | H01R 13/6583 | 174/354 |
| 8,894,438 B2* | 11/2014 | Schmitt | H01R 24/76 | 439/540.1 |
| 8,992,254 B2* | 3/2015 | Banakis | H01R 12/721 | 439/607.23 |
| 9,035,199 B2* | 5/2015 | Janota | H05K 9/0007 | 174/355 |
| 9,112,314 B2* | 8/2015 | Khazen | H01R 13/65802 | |
| 9,124,025 B2* | 9/2015 | Xue | G02B 6/4261 | |
| 9,142,910 B2* | 9/2015 | Yu | H01R 13/11 | |
| 9,142,922 B2* | 9/2015 | Regnier | H01R 13/65802 | |
| 9,246,252 B2* | 1/2016 | Kachlic | H01R 12/71 | |
| 9,252,538 B2* | 2/2016 | Recce | H01R 13/641 | |
| 9,252,544 B2* | 2/2016 | Yang | H01R 13/6593 | |
| 2002/0025720 A1* | 2/2002 | Bright | G02B 6/4246 | 439/541.5 |
| 2002/0131122 A1* | 9/2002 | Anderl | H04B 10/806 | 398/135 |
| 2002/0145856 A1* | 10/2002 | Jones | H01R 13/65802 | 361/752 |
| 2002/0197043 A1* | 12/2002 | Hwang | H01R 23/6873 | 385/134 |
| 2003/0141090 A1* | 7/2003 | Kruger | G02B 6/4201 | 174/50 |
| 2003/0169581 A1* | 9/2003 | Bright | G02B 6/4201 | 361/816 |
| 2003/0236019 A1* | 12/2003 | Hanley | G02B 6/4292 | 439/372 |
| 2004/0075993 A1* | 4/2004 | Hwang | G02B 6/4277 | 361/818 |
| 2004/0077217 A1* | 4/2004 | Hwang | H01R 23/6873 | 439/607.2 |
| 2004/0097136 A1* | 5/2004 | Flickinger | H05K 9/0058 | 439/607.01 |
| 2004/0203289 A1* | 10/2004 | Ice | H05K 9/0058 | 439/607.2 |
| 2005/0037655 A1* | 2/2005 | Henry | H01R 13/65802 | 439/341 |
| 2005/0208831 A1* | 9/2005 | Lee | H01R 13/65807 | 439/607.06 |
| 2005/0226571 A1* | 10/2005 | Malagrino, Jr. | G02B 6/4292 | 385/92 |
| 2005/0254257 A1* | 11/2005 | Long | G02B 6/0001 | 362/581 |
| 2005/0254772 A1* | 11/2005 | Long | G02B 6/0008 | 385/146 |
| 2005/0255726 A1* | 11/2005 | Long | G02B 6/0001 | 439/80 |
| 2006/0003628 A1* | 1/2006 | Long | H01R 12/716 | 439/541.5 |
| 2006/0003632 A1* | 1/2006 | Long | H01R 12/716 | 439/607.2 |
| 2006/0252311 A1* | 11/2006 | Togami | G02B 6/4277 | 439/607.2 |
| 2006/0281357 A1* | 12/2006 | Chen | G02B 6/4201 | 439/350 |
| 2006/0285806 A1* | 12/2006 | Ahrens | G02B 6/4246 | 385/92 |
| 2007/0066137 A1* | 3/2007 | Yang | H01R 43/18 | 439/607.01 |
| 2007/0128936 A1* | 6/2007 | Long | H01R 13/65802 | 439/607.28 |
| 2007/0128937 A1* | 6/2007 | Long | H01R 13/65802 | 439/607.01 |
| 2007/0183128 A1* | 8/2007 | Pirillis | H05K 9/0058 | 361/715 |
| 2007/0212942 A1* | 9/2007 | Long | G02B 6/4201 | 439/607.17 |
| 2007/0243741 A1* | 10/2007 | Yang | H01R 13/4364 | 439/304 |
| 2007/0253168 A1* | 11/2007 | Miller | G02B 6/4246 | 361/719 |
| 2007/0272041 A1* | 11/2007 | Bench | G02B 6/4201 | 73/865.6 |
| 2008/0019100 A1* | 1/2008 | Yang | H05K 9/0058 | 361/716 |
| 2008/0020640 A1* | 1/2008 | Zhang | H01R 13/65802 | 439/607.01 |
| 2008/0047746 A1* | 2/2008 | Chen | H05K 9/0058 | 174/369 |
| 2008/0102699 A1* | 5/2008 | Chen | G02B 6/4277 | 439/607.01 |
| 2008/0233799 A1* | 9/2008 | Winker | G02B 6/4201 | 439/607.01 |
| 2008/0299826 A1* | 12/2008 | Cheng | H01R 23/6873 | 439/607.01 |
| 2009/0098767 A1* | 4/2009 | Long | G02B 6/0001 | 439/541.5 |
| 2009/0116185 A1* | 5/2009 | Su | G02B 6/4201 | 361/688 |
| 2009/0176409 A1* | 7/2009 | Oki | H01R 13/65802 | 439/607.2 |
| 2010/0111476 A1* | 5/2010 | Shirk | G02B 6/0008 | 385/53 |
| 2010/0151733 A1* | 6/2010 | Tsou | H01R 23/6873 | 439/607.55 |
| 2010/0254112 A1* | 10/2010 | Brown | H05K 9/0058 | 361/818 |
| 2011/0031860 A1* | 2/2011 | Yang | H01R 13/518 | 312/352 |
| 2011/0053415 A1* | 3/2011 | Fonteneau | H05K 9/0058 | 439/607.01 |
| 2011/0059625 A1* | 3/2011 | Westman | H01R 13/514 | 439/55 |
| 2011/0223805 A1* | 9/2011 | Regnier | H01R 9/038 | 439/607.01 |
| 2011/0300757 A1* | 12/2011 | Regnier | H01R 29/00 | 439/626 |
| 2011/0300761 A1* | 12/2011 | Wang | H01R 13/659 | 439/638 |
| 2011/0317964 A1* | 12/2011 | Downs | G02B 6/4201 | 385/92 |
| 2012/0058670 A1* | 3/2012 | Regnier | H01R 13/65802 | 439/485 |

(56) References Cited

U.S. PATENT DOCUMENTS

| | | | | |
|---|---|---|---|---|
| 2012/0083156 A1* | 4/2012 | Fogg | H01R 13/6587 | 439/607.25 |
| 2012/0155108 A1* | 6/2012 | Scholeno | H01R 12/716 | 362/580 |
| 2012/0168122 A1* | 7/2012 | Skepnek | H01L 23/367 | 165/80.2 |
| 2012/0196477 A1* | 8/2012 | Nichols | H01R 13/518 | 439/607.01 |
| 2012/0231662 A1* | 9/2012 | Tsou | H01R 23/6873 | 439/607.55 |
| 2012/0322308 A1* | 12/2012 | Fogg | H01R 13/6587 | 439/607.25 |
| 2012/0329325 A1* | 12/2012 | Fogg | H01R 13/6587 | 439/607.25 |
| 2013/0033821 A1* | 2/2013 | Szczesny | H05K 9/0009 | 361/704 |
| 2013/0034993 A1* | 2/2013 | Szczesny | H01R 13/6587 | 439/607.17 |
| 2013/0077254 A1* | 3/2013 | Nguyen | G02B 6/4261 | 361/715 |
| 2013/0186681 A1* | 7/2013 | Wickes | H05K 9/0009 | 174/382 |
| 2014/0017949 A1* | 1/2014 | Schmitt | H01R 24/76 | 439/629 |
| 2014/0080352 A1* | 3/2014 | Xue | G02B 6/4261 | 439/487 |
| 2014/0148059 A1* | 5/2014 | Long | G02B 6/0001 | 439/626 |
| 2014/0153192 A1* | 6/2014 | Neer | H05K 9/0058 | 361/704 |
| 2014/0202755 A1* | 7/2014 | Ito | H05K 9/0018 | 174/359 |
| 2015/0072561 A1* | 3/2015 | Schmitt | H01R 13/6587 | 439/607.55 |
| 2015/0171558 A1* | 6/2015 | Yu | H01R 12/58 | 439/607.01 |
| 2015/0180168 A1* | 6/2015 | Han | H01R 13/506 | 439/353 |
| 2015/0214686 A1* | 7/2015 | Khazen | H01R 13/65802 | 29/453 |
| 2015/0280368 A1* | 10/2015 | Bucher | H01R 13/665 | 439/487 |
| 2015/0364850 A1* | 12/2015 | Yang | H01R 13/659 | 439/607.25 |
| 2016/0062065 A1* | 3/2016 | Wu | G02B 6/4269 | 385/89 |
| 2016/0064873 A1* | 3/2016 | Bucher | H01R 13/6691 | 385/88 |

* cited by examiner

US 9,391,407 B1

ELECTRICAL CONNECTOR ASSEMBLY HAVING STEPPED SURFACE

BACKGROUND OF THE INVENTION

The subject matter herein relates generally to electrical connector assemblies for high speed optical and electrical communication systems.

It is known to provide a metal cage with a plurality of ports, whereby transceiver modules are pluggable therein. Several pluggable module designs and standards have been introduced in which a pluggable module plugs into a receptacle which is electronically connected to a host circuit board. For example, a well-known type of transceiver developed by an industry consortium is known as a gigabit interface converter (GBIC) or serial optical converter (SOC) and provides an interface between a computer and a data communication network such as Ethernet or a fiber network. These standards offer a generally robust design which has been well received in industry.

It is desirable to increase the operating frequency of the network connections. Electrical connector systems that are used at increased operating speeds present a number of design problems, particularly in applications in which data transmission rates are high, e.g., in the range above 10 Gbps (Gigabits/second). One concern with such systems is reducing electromagnetic interference (EMI) emissions. Another concern is reducing operating temperatures of the transceivers.

In conventional designs, thermal cooling is achieved by using a heat sink and/or airflow over the outside of the shielding metal cage surrounding the receptacles. However, the thermal cooling provided by conventional designs is proving to be inadequate. Some cage designs allow airflow within the metal cage; however the various components within the cage, such as the receptacle connector, block or restrict airflow.

A need remains for an electrical connector assembly having improved thermal cooling compared to known assemblies.

BRIEF DESCRIPTION OF THE INVENTION

In one embodiment, an electrical connector assembly is provided including a cage member having a plurality of walls defining a port configured to receive a pluggable module therein through a front end of the cage member. The pluggable module is configured to be electrically connected to a communication connector housed within the cage member at a rear end of the cage member. The walls are manufactured from a metal material and provide electrical shielding for the pluggable module and the communication connector. The walls include side walls and a top wall between the side walls. The top wall is non-planar and includes an upper step and a lower step. The lower step is aligned above the communication connector at or near the rear end and the upper step is aligned above the pluggable module at or near the front end.

In another embodiment, an electrical connector assembly is provided including a cage member having a plurality of walls defining a port configured to receive a pluggable module therein through a front end of the cage member. The walls include side walls and a top wall between the side walls. The walls are manufactured from a metal material and provide electrical shielding. The electrical connector assembly includes a communication connector disposed within the cage member at a rear end of the cage member and positioned to mate with the pluggable module when the pluggable module is inserted into the port. The top wall is non-planar and includes an upper step and a lower step. The lower step is aligned above the communication connector at or near the rear end and the upper step is aligned above the pluggable module at or near the front end.

In a further embodiment, an electrical connector assembly is provided including a cage member having a plurality of walls defining an upper port and a lower port at a front end of the cage member. The walls include a port separator between upper port and the lower port. The walls include side walls and a top wall between the side walls extending to a rear end of the cage member. The walls are manufactured from a metal material and provide electrical shielding. The electrical connector assembly includes pluggable modules received in the upper port and the lower port. Each pluggable module has a circuit card held in a shell and heat dissipation fins extending from a top of the shell. The fins extend longitudinally at least partially between a mating end and an opposite end of the shell. The electrical connector assembly includes a communication connector disposed within the cage member at the rear end and positioned to mate with the pluggable modules when the pluggable modules are inserted into the upper and lower ports. The top wall is non-planar and includes an upper step and a lower step. The lower step is aligned above the communication connector at or near the rear end and the upper step is aligned above the heat dissipation fins of the pluggable module in the upper port.

DETAILED DESCRIPTION OF THE INVENTION

Figure 1:
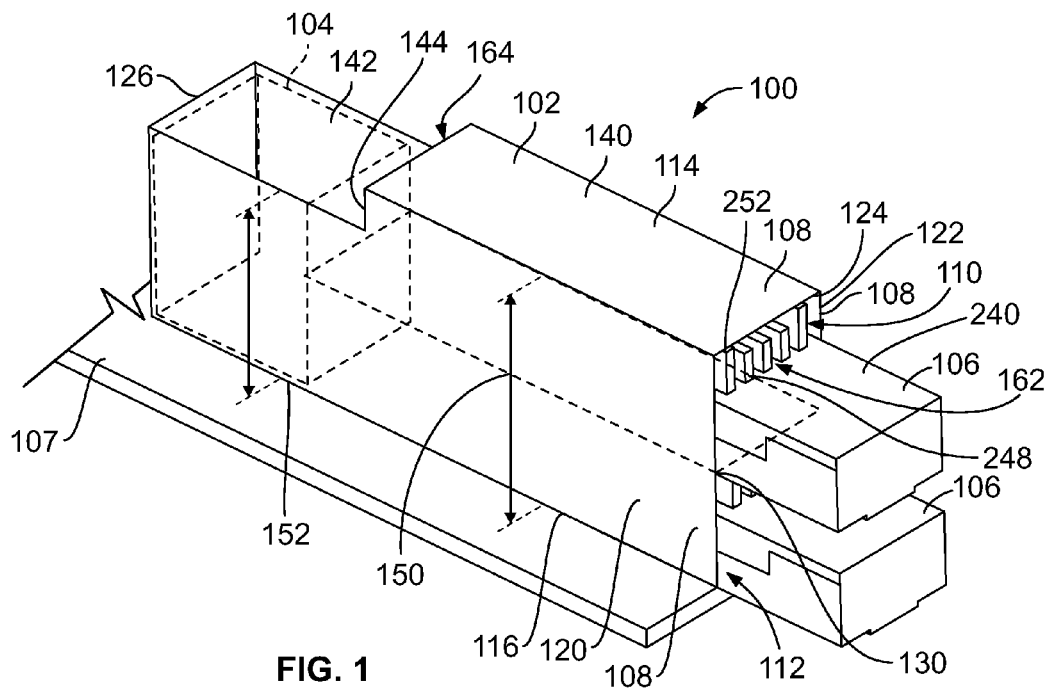
FIG. 1 is a front perspective view of an electrical connector assembly formed in accordance with an exemplary embodiment.
Figure 2:
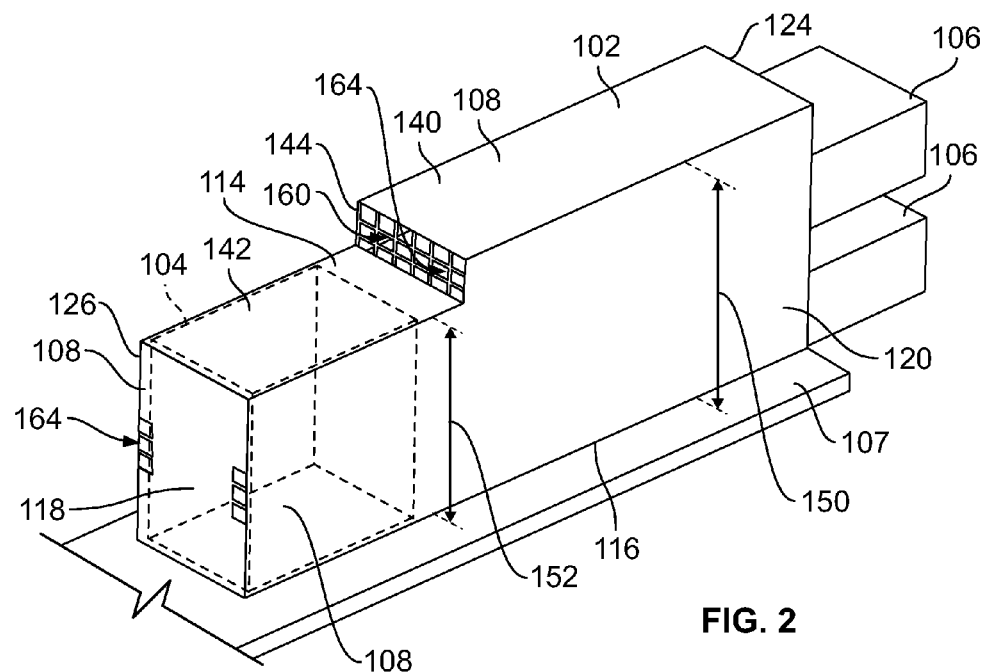
FIG. 2 is a rear perspective view of the electrical connector assembly.

FIG. 1 is a front perspective view of an electrical connector assembly 100 formed in accordance with an exemplary embodiment. FIG. 2 is a rear perspective view of the electrical connector assembly 100. The electrical connector assembly 100 includes a cage member 102 and a communication connector 104 (shown in phantom in FIGS. 1 and 2, also illustrated in FIGS. 3 and 5) received in the cage member 102. Pluggable modules 106 are configured to be loaded into the cage member 102 for mating with the communication connector 104. The cage member 102 and communication connector 104 are intended for placement on and electrical connection to a circuit board 107, such as a motherboard. The communication connector 104 is arranged within the cage member 102 for mating engagement with the pluggable modules 106.

The cage member 102 is a shielding, stamped and formed cage member that includes a plurality of shield walls 108 that define multiple ports 110, 112 for receipt of the pluggable modules 106. In the illustrated embodiment, the cage member 102 constitutes a stacked cage member having the ports 110, 112 in a stacked configuration. The port 110 defines an upper port positioned above the port 112 and may be referred to hereinafter as upper port 110. The port 112 defines a lower port positioned below the port 110 and may be referred to hereinafter as lower port 112. Any number of ports may be provided in alternative embodiments. In the illustrated embodiment, the cage member 102 includes the ports 110, 112 arranged in a single column, however, the cage member 102 may include multiple columns of ports 110, 112 in alternative embodiments (for example, 2×2, 3×2, 4×2, 4×3, etc.). In other alternative embodiments, the cage member 102 may include a single port or may include ports arranged in a single row (for example, non-stacked).

The cage member 102 includes a top wall 114, a lower wall 116, a rear wall 118 and side walls 120, 122, which together define the general enclosure or outer perimeter for the cage member 102. In an exemplary embodiment, the top wall 114 is non-planar. For example, the top wall 114 may be stepped downward at the rear, such as to improve airflow through the cage member 102. Optionally, at least a portion of the lower wall 116 may be open to allow the communication connector 104 to interface with the circuit board 107. The cage member 102 extends between a front end 124 and a rear end 126. The communication connector 104 may be positioned at or near the rear end 126 of the cage member 102. The pluggable modules 106 are configured to be loaded into the ports 110, 112 through the front end 124.

In an exemplary embodiment, the shield walls 108 may include a plurality of airflow openings or channels to allow airflow therethrough, such as from front to back, back to front and/or side to side. The airflow openings help cool the shield walls 108, the ports 110, 112 and/or the pluggable modules 106. The airflow openings may have any size and shape. In an exemplary embodiment, the size, shape, spacing and/or positioning of the airflow openings may be selected with consideration to thermal performance, shielding performance (e.g. electromagnetic interference (EMI) shielding), electrical performance, or other design considerations. Optionally, the stepped portion of the top wall 114 may include airflow openings.

The cage member 102 is subdivided by one or more port separators 130. In the illustrated embodiment, the port separator 130 extends horizontally between the side walls 120, 122. The port separator 130 divides the upper port 110 from the lower port 112. In embodiments having multiple columns of ports, port separators may be provided between the columns of ports. In some embodiments, the port separator 130 may be a single, planar wall. Alternatively, the port separator 130 may be U-shaped having two parallel walls with a joining wall therebetween and having a channel between the two parallel walls, such channel allowing airflow between the upper and lower ports 110, 112 and/or for routing light pipes or other components.

Figure 3:
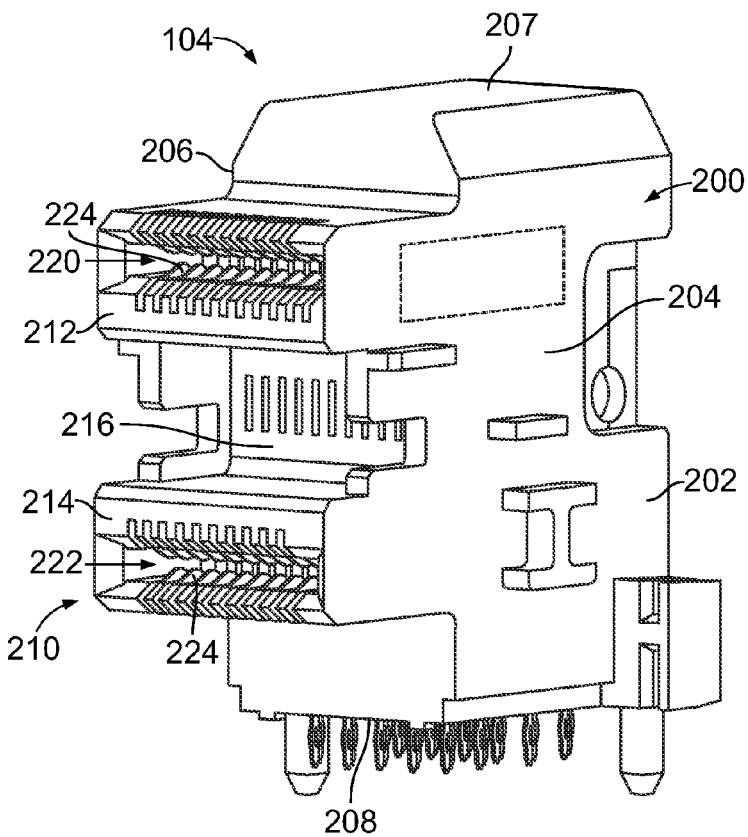
FIG. 3 is a front perspective view of a communication connector of the electrical connector assembly in accordance with an exemplary embodiment.

FIG. 3 is a front perspective view of the communication connector 104 in accordance with an exemplary embodiment. The communication connector 104 includes a housing 200 defined by an upstanding body portion 202 having sides 204, 206, an upper surface 207, a lower face 208 configured to be mounted to the circuit board 107 (shown in FIG. 1), and a mating face 210. Upper and lower extension portions 212 and 214 extend from the body portion 202 to define the mating face 210. A recessed face 216 is defined between the upper and lower extension portions 212, 214 at the front face of the body portion 202.

Circuit card receiving slots 220 and 222 extend inwardly from the mating face 210 of each of the respective upper and lower extension portions 212, 214, and extend inwardly to the body portion 202. The circuit card receiving slots 220, 222 are configured to receive card edges of circuit cards of the corresponding pluggable modules 106 (shown in FIG. 4). A plurality of contacts 224 are held by the housing 200 and are exposed within the circuit card receiving slots 220, 222 for mating with the corresponding pluggable module 106. The contacts 224 extend from the lower face 208 for termination to the circuit board 107. For example, the ends of the contacts 224 may constitute pins that are loaded into plated vias of the motherboard. Alternatively, the contacts 224 may be terminated to the circuit board 107 in another manner, such as by surface mounting to the circuit board 107.

Other types of communication connectors may be provided in alternative embodiments. For example, the communication connector may have a different mating interface. The housing may be shaped differently. The communication connector may have different types of contacts. For example, the communication connector may have contacts configured to mate with another type of pluggable module, such as a pluggable module that does not include a circuit card. Optionally, when the connector assembly has a single port as opposed to stacked ports, the communication connector includes only a single mating interface.

Figure 4:
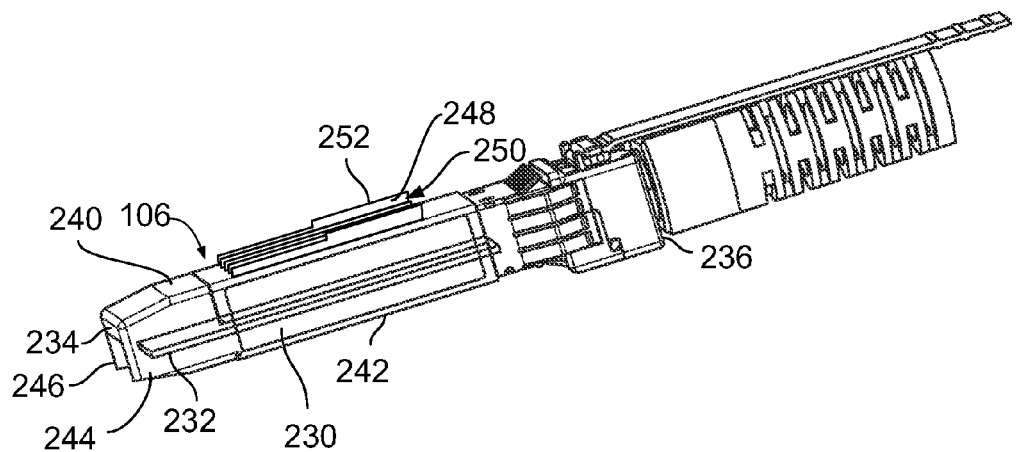
FIG. 4 illustrates an exemplary embodiment of a pluggable module for the electrical connector assembly.

FIG. 4 illustrates an exemplary embodiment of the pluggable module 106 for use with electrical connector assembly 100 (shown in FIG. 1). In the illustrated embodiment, the pluggable module 106 constitutes a small form-factor pluggable (SFP) module; however other types of pluggable modules or transceivers may be used in alternative embodiments. The pluggable module 106 includes a metal body or shell 230 holding a circuit card 232 at a mating end 234 thereof for interconnection into one of the slots 220 or 222 (shown in FIG. 3) of the communication connector 104 (shown in FIG. 3). The pluggable module 106 includes an electrical interconnection within the module to an interface at end 236, such as a copper interface in the way of a modular jack, or to a fiber optic connector for further interfacing. Optionally, a cable, such as an electrical cable or an optical cable, may extend from the end 236.

The shell 230 has a top 240, a bottom 242 and sides 244, 246 between the top 240 and the bottom 242. Optionally, the pluggable module 106 may include thermal interface features 248 configured to provide a thermal interface with the cage member 102 (shown in FIG. 1), such as for direct thermal contact or communication with the cage member 102. In the illustrated embodiment, the thermal interface features 248 are heat dissipation fins and may be referred to hereinafter as heat dissipation fins 248. The heat dissipation fins 248 may extend from any portion of the shell 230, such as the top 240, the bottom 242 and/or the sides 244. In an exemplary embodiment, the shell 230 is thermally conductive, such as a metal material, and the heat dissipation fins 248 dissipate heat from the shell 230. The heat dissipation fins 248 extend longitudinally at least partially between the mating end 234 and the opposite end 236 of the shell 230. The heat dissipation fins 248 have channels 250 between the heat dissipation fins 248 that allow airflow along the shell 230 and the heat dissipation fins 248, which cools the pluggable module 106. The heat dissipation fins 248 have outer edges 252. Optionally, the outer edges 252 of some or portions of some of the heat dissipation fins 248 may be elevated. The outer edges 252 may be configured to engage portions of the cage member 102 when loaded therein. In alternative embodiments, the pluggable module 106 may not include heat dissipation fins.

The pluggable module may include a latching feature for securing the pluggable module 106 in the cage member 102. The latching feature may be releasable for extraction of the pluggable module 106. Other types of pluggable modules or transceivers may be utilized in alternative embodiments.

Figure 5:
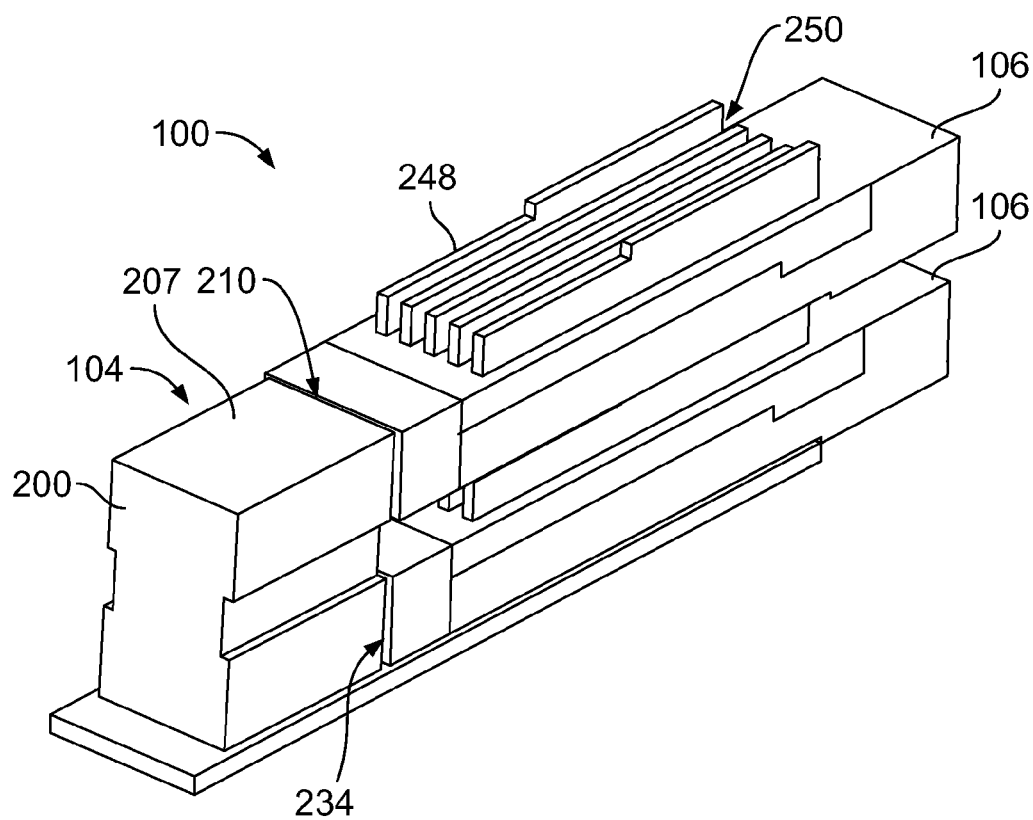
FIG. 5 illustrates a portion of the electrical connector assembly with a cage member thereof removed to show the pluggable modules mated to the communication connector.

FIG. 5 illustrates a portion of the electrical connector assembly 100 with the cage member 102 (shown in FIG. 1) removed to show the pluggable modules 106 mated to the communication connector 104. The mating ends 234 of the pluggable modules 106 are mated to the mating face 210 of the housing 200. The upper and lower extension portions 212, 214 (shown in FIG. 3) are received in the mating ends 234 of the pluggable modules 106 such that the circuit cards 232 (shown in FIG. 4) are mated with corresponding contacts 224 (shown in FIG. 3) of the communication connector 104.

In an exemplary embodiment, the upper surface 207 is positioned at a vertical height below at least a portion of the pluggable module 106 in the upper port 110. For example, the heat dissipation fins 248 may be positioned at a vertical height above the communication connector 104. Providing the upper surface 207 below the heat dissipation fins 248 and corresponding airflow channels 250 may allow more efficient airflow along the heat dissipation fins 248 as the communication connector 104 does not block such airflow.

Returning to FIGS. 1 and 2, the top wall 114 is stepped to accommodate the pluggable modules 106 and the communication connector 106 (FIG. 5). For example, because the pluggable modules 106 include the heat dissipation fins 248, the pluggable module 106 in the upper port 110 extends above the top of the communication connector 104. The top wall 114 is stepped upward in the area of the pluggable module 106 to accommodate the heat dissipation fins 248. The upper port 110 allows airflow along the top of the pluggable module 106, such as along the interior side of the top wall 114 (for example, between the top wall 114 and the top 240 of the pluggable module 106.

The top wall 114 is stepped downward along the communication connector 104. The top wall 114 may engage the upper surface 207 (shown in FIG. 3), which may be useful when mounting the electrical connector assembly 100 to the circuit board 107. For example, the top wall 114 may be pressed downward to mount the electrical connector assembly 100 to the circuit board 107. The downward pressure may be transferred directly to the communication connector 104 to press the communication connector 104 onto the circuit board 107. For example, pins or tails of the communication connector 104 may be pressed into vias of the circuit board 107.

The top wall 114 includes an upper step 140 and a lower step 142 with a riser wall 144 therebetween. Optionally, the upper step 140 and the lower step 142 may extend an entire length of the cage member 102 between the front end 124 and the rear end 126. For example, in the illustrated embodiment, the upper step 140 extends approximately the front 60% of the length while the lower step 142 extends approximately the rear 40% of the length; however the upper step 140 may be longer or shorter and/or the lower step 142 may be longer or shorter in alternative embodiments. Additional steps may be provided in alternative embodiments spanning portions of the length of the cage member 102.

The lower step 142 is aligned above the communication connector 104 at or near the rear end 126. Optionally, the lower step 142 may extend at least partially over the pluggable module 106. For example, the lower step 142 may extend to an area at or near ends of the heat dissipation fins 248. The upper step 140 is aligned above the pluggable module 106 at or near the front end 124. The upper step 140 may engage an upper surface of the pluggable module 106 received in the upper port 110, such as along the outer edges 252. As such, heat transfer may occur through the direct connection between the heat dissipation fins 248 and the top wall 114. Optionally, the upper step 140 may extend at least partially over the communication connector 104. The riser wall 144 extends vertically between the upper step 140 and the lower step 142. In an exemplary embodiment, the upper and lower steps 140, 142 as well as the riser wall 144 extend the full width of the cage member 102 between the side walls 120, 122.

The cage member 102 is mounted to the circuit board 107 such that the upper step 140 is positioned a first distance from the circuit board 107, defining a first height of the cage member 102. The first distance and the first height are represented by reference 150. The lower step 142 is positioned a second distance from the circuit board 107 defining a second height of the cage member 102. The second distance and the second height are represented by reference 152. The second distance/height 152 is less than the first distance/height 150. Optionally, the lower step 142 is positioned at a vertical height 152 below at least a portion of the pluggable module 106 in the upper port 110. For example, the heat dissipation fins 248 may be positioned at a vertical height above the second height 152. As such, the lower step 142 is considered to be positioned below the heat dissipation fins 248. Providing the lower step 142 below the heat dissipation fins 248 may allow more efficient airflow through cage member 102 along the heat dissipation fins 248. For example, the airflow length through the cage member 102 is shorter from the front end 124 to the riser wall 144 than systems that do not include the stepped top wall 114 and that would have airflow from the front end 124 to the rear end 126. The communication connector 104 and the cage member 102 do not block or resist airflow along such length or portion of the electrical connector assembly 100.

In an exemplary embodiment, the riser wall 144 has at least one airflow opening 160 to allow airflow therethrough. The airflow opening 160 defines an air inlet or an air outlet for the cage member 102. The airflow system may be set up such that the air flows from the front of the cage member 102 to the rear of the cage member 102. In such embodiments, air inlets 162 are provided at the front end 124 of the cage member 102 while air outlets 164 are provided at or near the rear end 126 of the cage member 102. For example, in such embodiments, the airflow opening 160 may define the air outlet 164 for the upper port 110. Optionally, other air outlets 164 may be provided for the lower port 112, such as along sides of the communication connector 104 at the rear wall 118. However, the airflow system may be set up such that the air flows in the opposite direction from the rear end 126 of the cage member 102 to the front end 124 of the cage member 102. In such embodiments, the airflow opening 160 may define the air inlet 162 for the upper port 110. Optionally, the cage member 102 may have EMI reducers at the airflow opening 160. For example, the cage member 102 may include cross members that span across the airflow opening 160 to reduce the size of the openings at the airflow opening 160.

During use, the pluggable modules 106 generate heat. It is desirable to remove the heat generated by the pluggable modules 106 so that the pluggable modules 106 can operate at higher performance levels. The heat generated by the pluggable modules 106 is thermally transferred to the cage member 102. For example, in an exemplary embodiment, various walls of the cage member 102 are configured to be in direct thermal contact or communication with the pluggable modules 106 in the upper port 110 and the lower port 112. Having the various walls in thermal communication with the pluggable modules 106 allows efficient heat dissipation from the pluggable modules 106 as the heat may be transferred into any or all of the walls, which may then be cooled by airflow across the walls. Airflow along the walls 108 and/or through the ports 110, 112 cools the cage member 102, allowing more heat transfer from the pluggable modules 106. The airflow through the cage member 102 may be forced, such as by a fan or other component mounted proximate to the cage member 102. The airflow helps to reduce the temperature of the pluggable modules 106.

The thermal efficiency of the cage member 102, and thus the amount of heat transfer from a particular port 110, 112, is at least partially dependent on the amount of airflow through the cage member 102. Providing airflow through the ports 110, 112, such as above the pluggable modules 106, increases the amount of heat transfer from the pluggable modules 106. By shortening the flow path along the top of the cage member 102 (for example, by stepping down the top wall 114 at the rear end 126), more efficient heat dissipation may occur. Optionally, the side walls 120, 122 may include openings or vents that allow airflow therethrough.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. An electrical connector assembly comprising:
a cage member having a plurality of walls defining a port configured to receive a pluggable module therein through a front end of the cage member, the pluggable module being configured to be electrically connected to a communication connector housed within the cage member at a rear end of the cage member, the walls being manufactured from a metal material and providing electrical shielding for the pluggable module and the communication connector;
the plurality of walls comprising side walls and a top wall between the side walls, the top wall being non-planar and including an upper step and a lower step, the lower step being aligned above the communication connector at or near the rear end, the upper step being aligned above the pluggable module at or near the front end.

2. The electrical connector assembly of claim 1, wherein the cage member has a first height along the upper step and a second height along the lower step, the second height being less than the first height.

3. The electrical connector assembly of claim 1, wherein the cage member is configured to be mounted to a circuit board, the upper step being positioned a first distance from the circuit board, the lower step being positioned a second distance from the circuit board less than the first distance.

4. The electrical connector assembly of claim 1, wherein the upper step extends between the side walls and wherein the lower step extends between the side walls.

5. The electrical connector assembly of claim 1, wherein a riser wall extends vertically between the upper step and the lower step, the riser wall having at least one opening to allow airflow therethrough.

6. The electrical connector assembly of claim 1, wherein the upper step and the lower step extend an entire length between the front end and the rear end.

7. The electrical connector assembly of claim 1, wherein the lower step is configured to be positioned at a vertical height below at least a portion of the pluggable module.

8. The electrical connector assembly of claim 1, wherein the lower step is configured to engage an upper surface of the communication connector and wherein the upper step is configured to engage an upper surface of the pluggable module.

9. An electrical connector assembly comprising:
a cage member having a plurality of walls defining a port configured to receive a pluggable module therein through a front end of the cage member, the plurality of walls defining side walls and a top wall between the side walls, the walls being manufactured from a metal material and providing electrical shielding;
a communication connector disposed within the cage member at a rear end of the cage member and positioned to mate with the pluggable module when the pluggable module is inserted into the port;
the top wall being non-planar and including an upper step and a lower step, the lower step being aligned above the communication connector at or near the rear end, the upper step being aligned above the pluggable module at or near the front end.

10. The electrical connector assembly of claim 9, wherein the cage member has a first height along the upper step and a second height along the lower step, the second height being less than the first height.

11. The electrical connector assembly of claim 9, wherein the cage member is configured to be mounted to a circuit board, the upper step being positioned a first distance from the circuit board, the lower step being positioned a second distance from the circuit board less than the first distance.

12. The electrical connector assembly of claim 9, wherein the upper step extends between the side walls and wherein the lower step extends between the side walls.

13. The electrical connector assembly of claim 9, wherein a riser wall extends vertically between the upper step and the lower step, the riser wall having at least one opening to allow airflow therethrough.

14. The electrical connector assembly of claim 9, wherein the lower step is configured to be positioned at a vertical height below at least a portion of the pluggable module.

15. The electrical connector assembly of claim 9, wherein the lower step engages an upper surface of the communication connector and wherein the upper step is configured to engage an upper surface of the pluggable module.

16. The electrical connector assembly of claim 9, wherein an upper surface of the communication connector is positioned at a lower vertical height than at least a portion of the pluggable module, the lower step engaging the upper surface of the communication connector such that the lower step is positioned at a lower vertical height than at least a portion of the pluggable module.

17. An electrical connector assembly comprising:
a cage member having a plurality of walls defining an upper port and a lower port at a front end of the cage member, the plurality of walls including a port separator between upper port and the lower port, the plurality of walls including side walls and a top wall between the side walls extending to a rear end of the cage member, the walls being manufactured from a metal material and providing electrical shielding;
pluggable modules received in the upper port and the lower port, each pluggable module having a circuit card held in a shell, each pluggable module having heat dissipation fins extending from a top of the shell, the fins extending longitudinally at least partially between a mating end and an opposite end of the shell;
a communication connector disposed within the cage member at the rear end and positioned to mate with the pluggable modules when the pluggable modules are inserted into the upper and lower ports;
wherein the top wall is non-planar and includes an upper step and a lower step, the lower step being aligned above the communication connector at or near the rear end, the upper step being aligned above the heat dissipation fins of the pluggable module in the upper port.

18. The electrical connector assembly of claim 17, wherein the heat dissipation fins are planar and vertically oriented with channels therebetween, the channels allowing airflow longitudinally along the shell and heat dissipation fins between the mating end and the opposite end of the shell.

19. The electrical connector assembly of claim 17, wherein the upper step engages outer edges of at least some of the heat dissipation fins.

20. The electrical connector assembly of claim 17, wherein the cage member has a first height along the upper step and a second height along the lower step, the second height being less than the first height.

* * * * *